(No Model.) 2 Sheets—Sheet 1.
G. H. ELLIS.
PORTABLE APPARATUS FOR USE WITH CLOSETS, COMMODES, AND THE LIKE FOR DEODORIZING AND DISINFECTING PURPOSES.
No. 339,752. Patented Apr. 13, 1886.
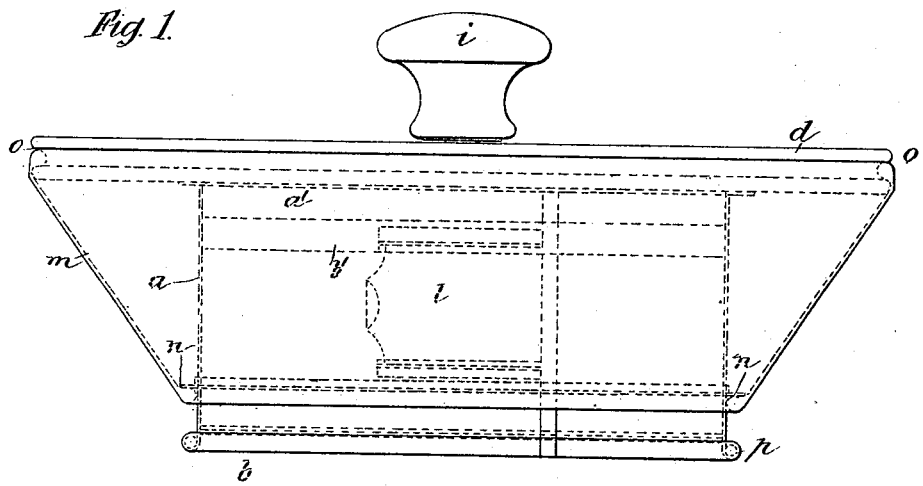
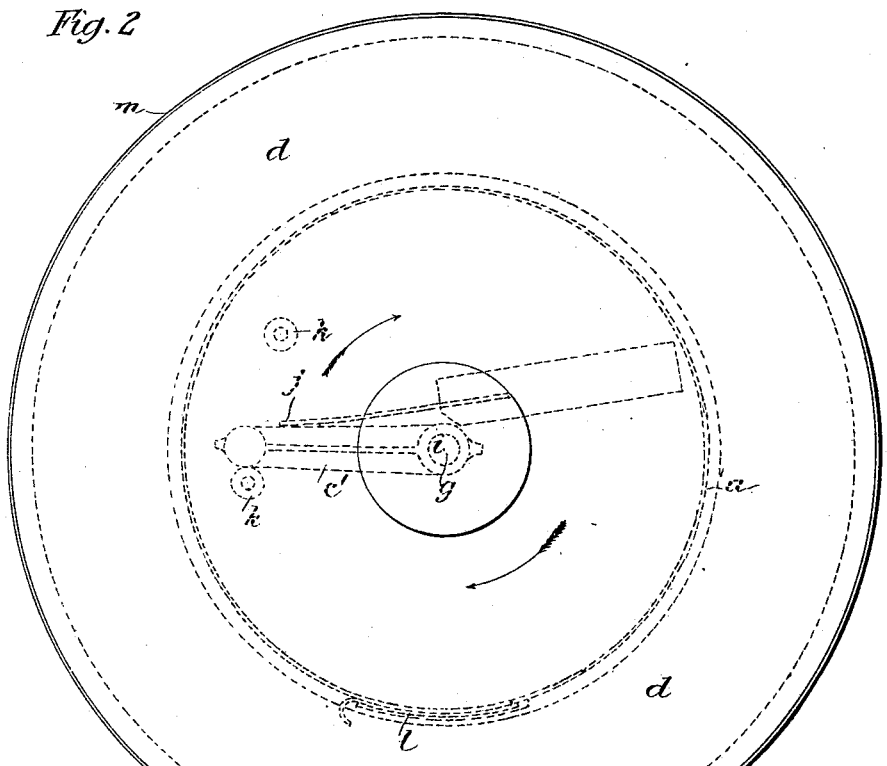
Witnesses
Will. T. Norton
Wm. R. Davis,
Inventor:
George Henry Ellis
by John J. Halsted & Son
his Attys.
N. PETERS. Photo-Lithographer, Washington, D. C.

(No Model.) 2 Sheets—Sheet 2.
G. H. ELLIS.
PORTABLE APPARATUS FOR USE WITH CLOSETS, COMMODES, AND THE LIKE FOR DEODORIZING AND DISINFECTING PURPOSES.
No. 339,752. Patented Apr. 13, 1886.
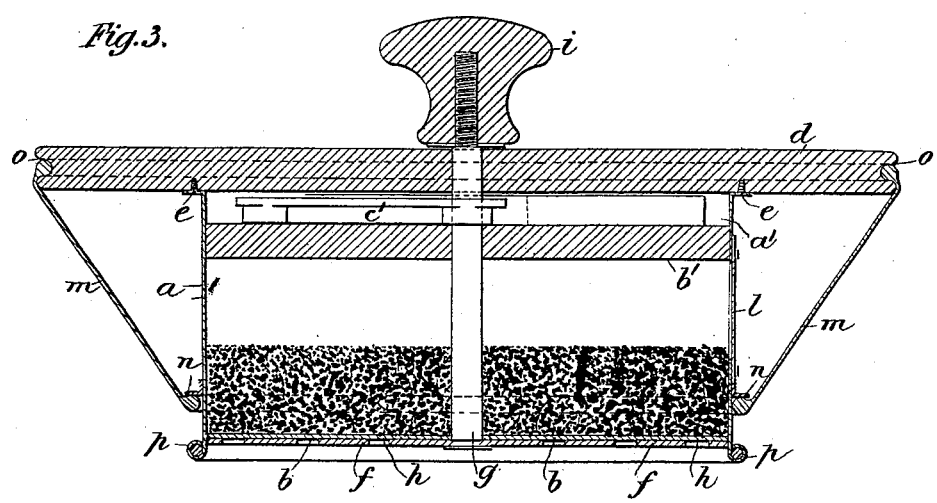
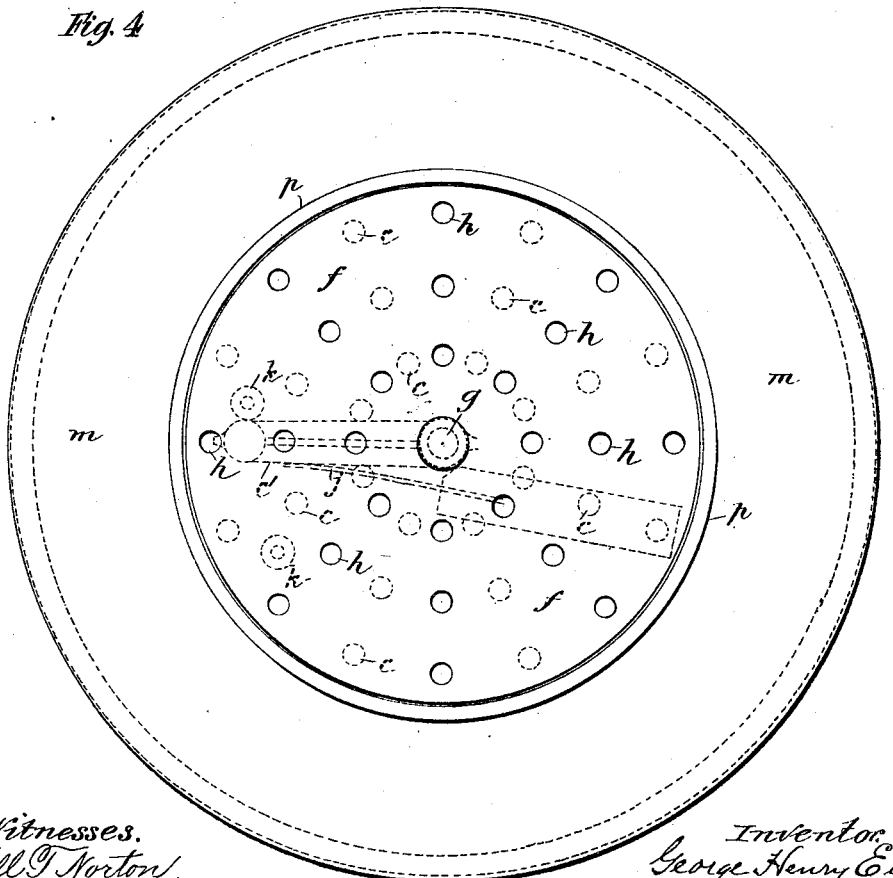

United States Patent Office.

GEORGE H. ELLIS, OF LONDON, ENGLAND.

PORTABLE APPARATUS FOR USE WITH CLOSETS, COMMODES, AND THE LIKE, FOR DEODORIZING AND DISINFECTING PURPOSES.

SPECIFICATION forming part of Letters Patent No. 339,752, dated April 13, 1886.

Application filed December 16, 1885. Serial No. 185,787. (No model.)

*To all whom it may concern:*

Be it known that I, GEORGE HENRY ELLIS, a subject of the Queen of Great Britain, residing at London, England, have invented a new and useful Improved Portable Apparatus for Use with Closets, Commodes, and the Like, for Deodorizing and Disinfecting Purposes, of which the following is a specification.

My invention relates to the construction of a portable and convenient apparatus for sprinkling or distributing carbon, dried earth or sifted ashes, or other disinfecting or deodorizing material, either in the form of powder or grains, in water-closets, earth-closets, common privies, night-commodes, children's stools, and the like.

In order to enable my invention to be fully understood, I will proceed to describe the same by reference to the accompanying drawings, in which—

Figure 1 is an elevation, and Fig. 2 a plan, of an apparatus constructed according to my invention for use with closets, commodes, and the like, for deodorizing and disinfecting purposes. Fig. 3 is a transverse section of Fig. 1, and Fig. 4 is a plan of the under side of the apparatus.

Similar letters in all the figures represent similar parts.

My improved apparatus is constructed of a cylindrical box or case, $a$, for containing the carbon or other disinfecting or deodorizing material, and which is of such a size that it can be introduced into the usual opening or hole in the seat of the closet or the like.

$b$ is the bottom of the box $a$, perforated with a number of holes, $c\ c\ c$, as clearly shown in dotted lines at Fig. 4.

$d$ is the top of the box or case, which is of larger diameter than the box or case $a$.

$e\ e$ are screws by which the box or case $a$ and top $d$ are secured together, and which can be easily removed to allow of access to the interior of the apparatus.

$f$ is a false bottom or plate below the perforated bottom of the box or case $a$, and fixed to the spindle or rod $g$, passing through the center of the box or case $a$.

$h\ h\ h$ are holes in the plate $f$. These holes are clearly shown in full lines in Fig. 4, and, as will be seen, they correspond in size and number with the holes $c$ in the bottom $b$ of the box or case $a$.

$i$ is a knob or handle in the center of the top of the apparatus, for partially rotating the plate $f$, as hereinafter described. The said knob or handle is fixed to the upper end of the spindle or rod $g$.

$j$ is a spring for rotating the plate $f$ in the opposite direction, so as to normally keep the holes $c$ in the box or case $a$ closed, as shown in Fig. 4. The said spring is fixed in a recess, $a'$, between the top $d$ of the apparatus and a disk, $b'$, fixed inside the box or case $a$, and bears against a projection or arm, $c'$, fixed on the spindle $g$.

$k\ k$ are stops between which the projection or arm $c'$ moves, and which in this manner serve to limit the extent of rotation of the plate $f$.

$l$ is a slide or door covering the opening in the box or case $a$, through which the apparatus is charged with the disinfecting or deodorizing material.

$m$ is a packing, made of a strip of sheet india-rubber, for preventing the said material from being deposited on the edges of the opening or hole in the seat of the closet or the like.

$n$ is a flange formed round the side of the box or case $a$, against which the lower edge of the packing $m$ bears; and $o$ is a groove in the periphery of the top $d$ of the apparatus, in which the upper edge of the packing $m$ fits. By this means the strip of sheet india-rubber $m$ is stretched around the side of the apparatus, and will cover or protect the edges of the seat when the apparatus is introduced into the opening or hole in the seat of the closet or the like.

$p$ is a rim or flange on the bottom of the box or case $a$, on which rim or flange the apparatus stands when not in use, thereby avoiding the risk of the perforations becoming choked.

To make use of an apparatus of this construction, a supply of powdered or granulated carbon or other suitable disinfecting or deodorizing material is first introduced into the box or case $a$ through the opening therein closed by the slide or door $l$, the packing $m$ being previously removed from the apparatus to allow of this being done. The packing m is then replaced, as shown in Figs. 1 and 3. The apparatus is then lifted by the knob or handle i, and the lower end is introduced into the hole or opening in the seat of the closet or the like, the packing m covering the edges thereof, and the top d resting on the packing m on the surface of the seat. The relative positions of the holes c and h in the bottom b of the box or case a and in the plate f, respectively, will be those shown in Fig. 4, and the holes c will be therefore closed. The knob or handle i is then turned in the direction indicated by the arrows in Fig. 2, and the holes c and h will be brought opposite each other, and a quantity of the carbon or other material allowed to fall from the apparatus. The knob or handle being released, the openings c will be again closed, and the apparatus can then be removed.

By rotating or partly rotating the apparatus, and thereby causing the packing m to sweep over the top and edges of the opening in the closet, the parts brought in contact will be kept clean.

The packing or band m may be of baize instead of rubber.

Having now particularly described and ascertained the nature of my said invention and in what manner the same is to be performed, I declare that what I claim is—

1. In combination with the box a, and with the fixed and with the false perforated bottoms in face contact with each other, the slide l in the side of the box, and the flexible band applied to and surrounding the box, and leaving a surrounding but inclosed space between such box and band, all substantially as and for the purposes set forth.

2. In combination with the cylindrical box for holding a deodorizing material, and adapted for insertion in an opening in the seat and for discharging the material, an elastic or flexible packing-band, m, applied to the exterior of the box, and cone-shaped or of increasing circumference from its bottom upward, and also serving to prevent the deodorized material from being deposited on the seat.

GEO. H. ELLIS.

Witnesses:
G. F. REDFERN,
B. BRADY.